(12) United States Patent
Tiziani

(10) Patent No.: US 12,431,024 B2
(45) Date of Patent: Sep. 30, 2025

(54) PROVIDING AUTONOMOUS VEHICLE ASSISTANCE

(71) Applicant: Micron Technology, Inc., Boise, ID (US)

(72) Inventor: Federico Tiziani, Munich (DE)

( * ) Notice: Subject to any disclaimer, the term of this patent is extended or adjusted under 35 U.S.C. 154(b) by 756 days.

(21) Appl. No.: 16/927,835

(22) Filed: Jul. 13, 2020

(65) Prior Publication Data

US 2020/0342241 A1 Oct. 29, 2020

Related U.S. Application Data

(63) Continuation of application No. 15/846,916, filed on Dec. 19, 2017, now Pat. No. 10,713,502.

(51) Int. Cl.
| | |
|---|---|
| *G08G 1/00* | (2006.01) |
| *B60W 30/18* | (2012.01) |
| *B60W 50/00* | (2006.01) |
| *G05D 1/00* | (2024.01) |
| *G06F 18/2413* | (2023.01) |
| *G06V 10/764* | (2022.01) |
| *G06V 20/56* | (2022.01) |
| *G06V 40/10* | (2022.01) |
| *G06V 40/16* | (2022.01) |
| *G08G 1/0965* | (2006.01) |
| *H04H 20/59* | (2008.01) |
| *H04W 4/40* | (2018.01) |
| *H04W 4/90* | (2018.01) |

(52) U.S. Cl.
CPC ....... *G08G 1/202* (2013.01); *B60W 30/18009* (2013.01); *B60W 50/0098* (2013.01); *G05D 1/0088* (2013.01); *G05D 1/0214* (2013.01); *G06F 18/2413* (2023.01); *G06V 10/764* (2022.01); *G06V 20/56* (2022.01); *G06V 40/10* (2022.01); *G06V 40/172* (2022.01); *G08G 1/0965* (2013.01); *H04H 20/59* (2013.01); *H04W 4/40* (2018.02); *H04W 4/90* (2018.02)

(58) Field of Classification Search
CPC .... G08G 1/202; G08G 1/0965; G06V 40/172; G06V 40/10; G06V 10/764; G06V 20/56; G06F 18/2413; B60W 30/18009; B60W 50/0098; G05D 1/0088; G05D 1/0214; H04H 20/59

See application file for complete search history.

(56) References Cited

U.S. PATENT DOCUMENTS

| | | | |
|---|---|---|---|
| 9,905,133 B1 * | 2/2018 | Kumar | G07C 5/0808 |
| 10,713,502 B2 | 7/2020 | Tiziani | |
| 10,782,681 B1 * | 9/2020 | Slavin | G05D 1/0022 |
| 10,891,856 B1 * | 1/2021 | Graham | G08G 1/0955 |

(Continued)

*Primary Examiner* — Michael D Lang
(74) *Attorney, Agent, or Firm* — Greenberg Traurig

(57) ABSTRACT

Systems and methods for providing autonomous vehicle assistance are disclosed. In one embodiment, a method is disclosed comprising recording an image of a scene surrounding an autonomous vehicle; classifying the image using a machine learning system, the classifying comprising identifying whether the image includes a danger; determining whether the autonomous vehicle is able to respond to the danger in response to identifying that the image includes the danger; and executing one or more security maneuvers, the security maneuvers manipulating the operation of the autonomous vehicle in response to the danger.

20 Claims, 12 Drawing Sheets

(56) References Cited

U.S. PATENT DOCUMENTS

| | | |
|---|---|---|
| 2015/0348335 A1 | 12/2015 | Ramanujam |
| 2017/0038777 A1 | 2/2017 | Harvey |
| 2017/0299633 A1 | 10/2017 | Pietrowicz et al. |
| 2018/0272992 A1 | 9/2018 | Gage et al. |
| 2018/0322775 A1 | 11/2018 | Chase et al. |
| 2019/0130763 A1* | 5/2019 | Kawasaki .......... H04B 7/15507 |
| 2019/0188493 A1 | 6/2019 | Tiziani |
| 2019/0197795 A1 | 6/2019 | Mondello et al. |

* cited by examiner

PROVIDING AUTONOMOUS VEHICLE ASSISTANCE

CROSS REFERENCE TO RELATED MATTERS

The present application is a continuation application of U.S. patent application Ser. No. 15/846,916 filed Dec. 19, 2017, entitled "Providing Autonomous Vehicle Assistance", the entire disclosure of which application is hereby incorporated herein by reference.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The present disclosure relates to the field of autonomous vehicles and, specifically, to systems and methods for utilizing autonomous vehicles to provide assistance to distressed persons.

Currently, the technology supporting autonomous vehicles continues to improve. Improvements in digital camera technology, light detection and ranging (Lidar), and technologies have enabled vehicles to navigate roadways independent of drivers or with limited assistance from drivers. In some environments, such as factories, autonomous vehicles operate without any human intervention whatsoever.

While autonomous technology is primarily focused on control the movement of vehicles in a traditional sense, little emphasis has been placed on alternative applications that may be implemented on top of these autonomous systems. Indeed, application-level systems generally tend to reinforce existing uses of autonomous systems. For example, experimental uses of autonomous technology have been utilized to perform function such as returning vehicles to a known location after delivering a passenger or performing refueling of vehicles while not utilized by passengers.

These approaches however fail to utilize the wealth of hardware and processing power being implemented in autonomous vehicles. Thus, there currently exists a need in the state of the art of autonomous vehicles to provide additional services leveraging the existing hardware installed within such vehicles.

BRIEF SUMMARY

The disclosed embodiments are directed toward utilizing existing autonomous vehicles sensors to provide pedestrian assistance. The disclosed embodiments are additionally related to leveraging such sensors to assist law enforcement.

In one embodiment, the disclosed embodiments describe systems and methods for assisting to pedestrians or other individuals in danger. First, the embodiments describe specific techniques for utilizing digital cameras installed within an autonomous vehicle to detect distressed individuals (for example, using deep neural networks to classify images of pedestrians as distressed).

After detecting individuals who are in distressed, the disclosed embodiments describe techniques for utilizing autonomous vehicles to provide assistance. In one embodiment, the disclosed embodiments describe methods for activating a vehicle siren or horn as well as notifying emergency personal of the distressed individual (e.g., using precise geographic coordinates of the individual as well as supplemental information such as video or images of the distressed individual). In other embodiments, the disclosed embodiments describe techniques for controlling autonomous vehicles to utilize the vehicles as an assistive vehicle that allows a distressed individual to escape danger.

The disclosed embodiments additionally describe techniques for leveraging autonomous vehicles to assist law enforcement. In one embodiment, the disclosed embodiments describe techniques for identifying autonomous vehicles that are operated by a person of interest under observation or pursuit by authorities. The disclosed embodiments describe a technique for automatically disabling, or otherwise controlling, the autonomous vehicle operated by a person of interest. The disclosed embodiments additionally describe techniques for controlling a fleet of autonomous vehicles to capture a person of interest by, for example, "boxing in" the vehicle of a person of interest.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1A:
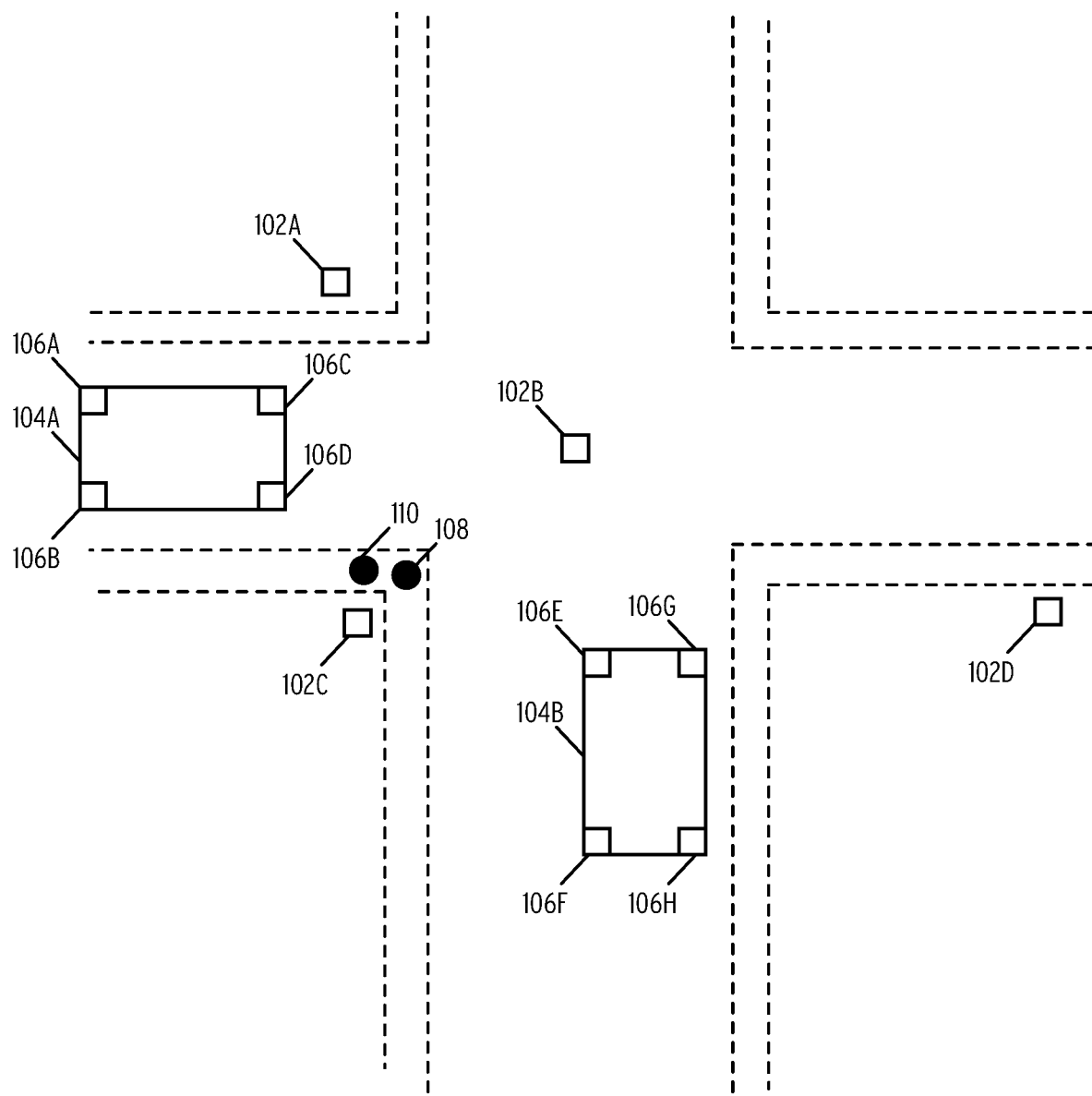
FIGS. 1A, 1B, and 1C are diagrams illustrating roadways including various sensors and autonomous vehicles according to some embodiments of the disclosure.
Figure 1B:
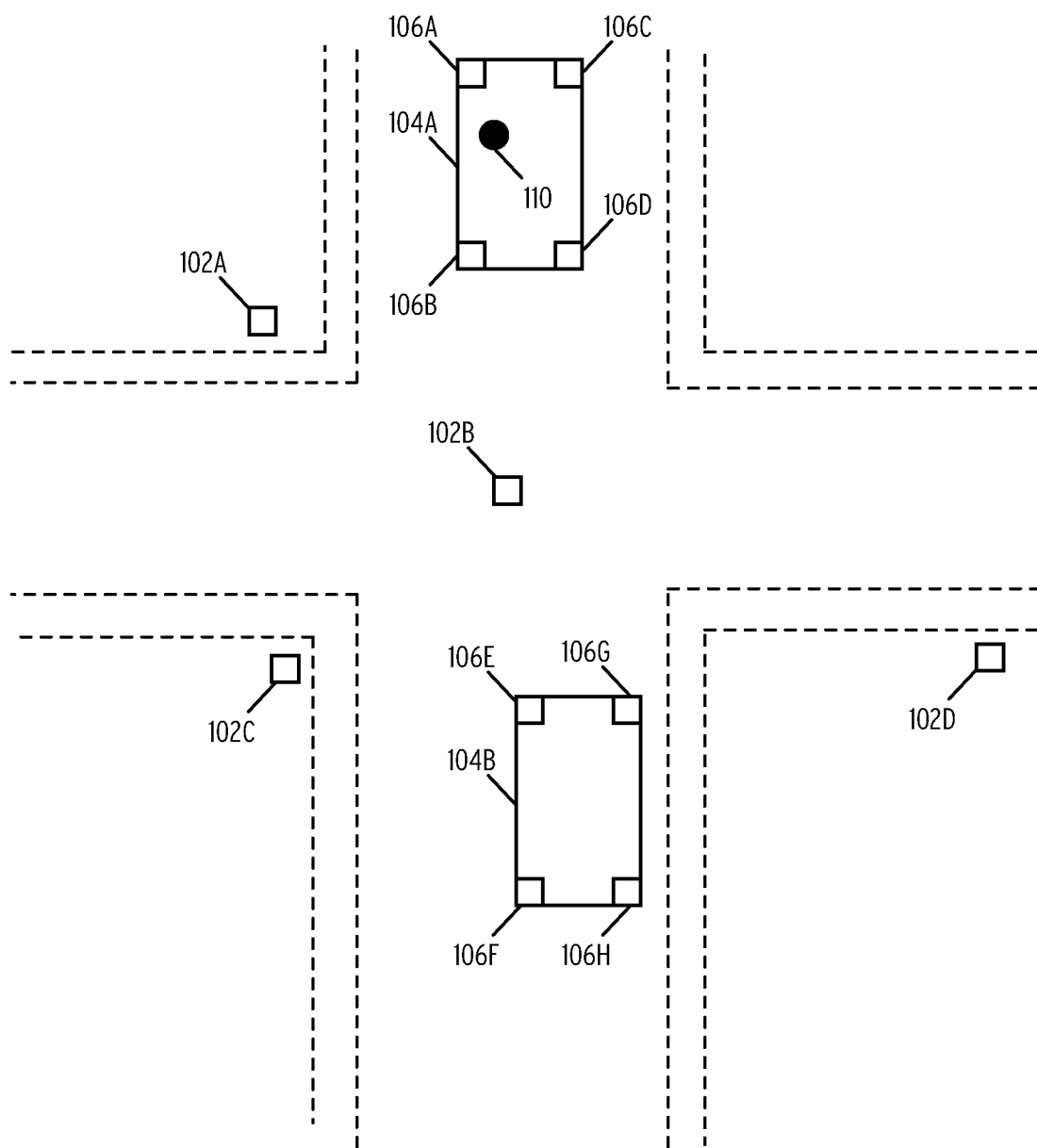
Figure 1C:
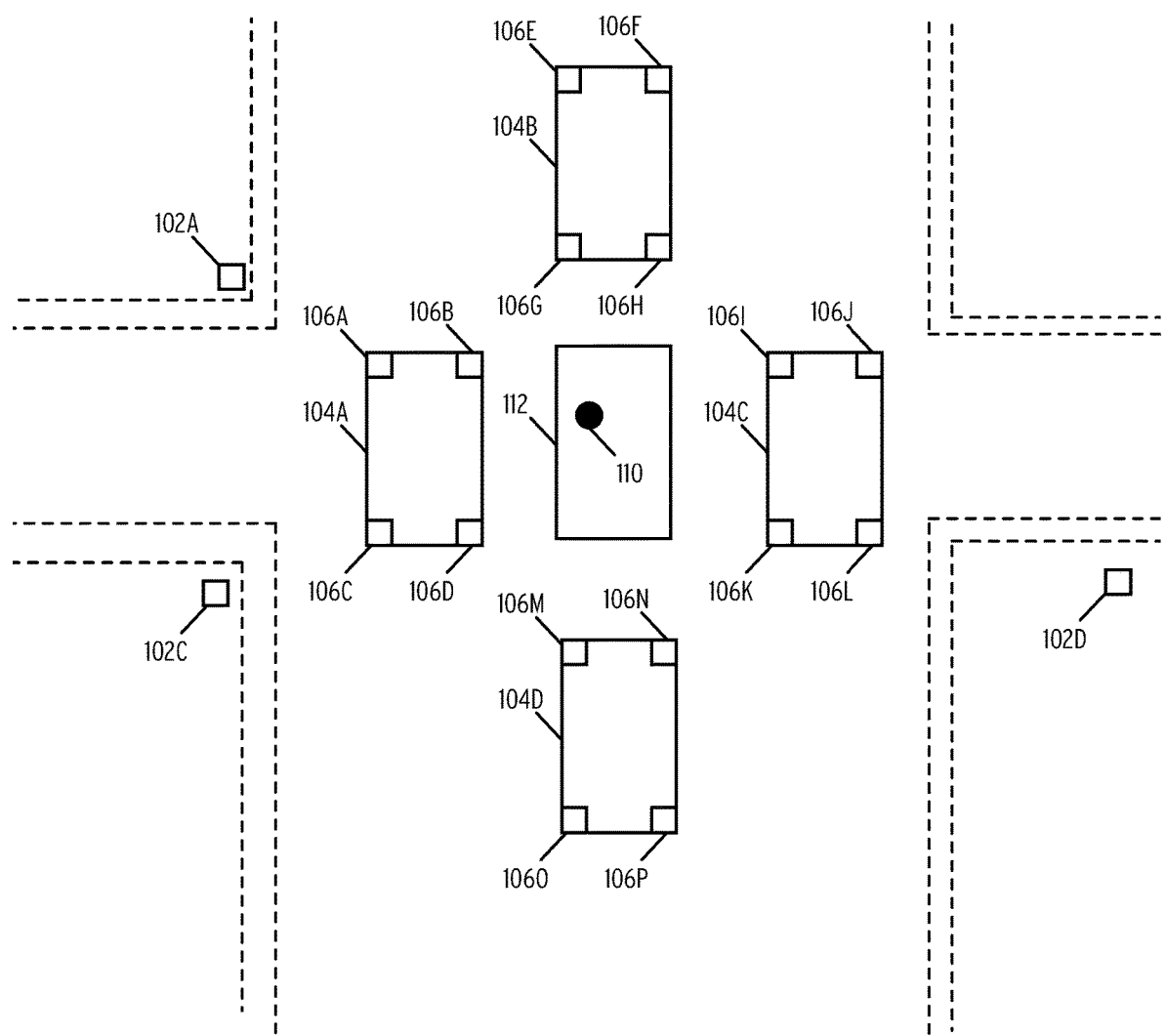

FIGS. 1A, 1B, and 1C are diagrams illustrating roadways including various sensors and autonomous vehicles according to some embodiments of the disclosure.

In the illustrated scenario, a plurality of camera devices (102A-102D) is installed at various locations on or near the roadway. In the illustrated embodiment, these cameras (102A-102D) may comprise any network-enabled camera including any camera device coupled to a wired network or wireless (e.g., cellular network). For example, camera (102B) comprises a camera attached to a traffic light while cameras (102A, 102C, 102D) comprise privately owned camera devices installed on, for example, buildings. As illustrated, these camera devices (102A-102D) represent fixed camera devices capturing a given field of view. In some embodiments, the cameras (102A-102D) may be controlled or accessed by a remote data processing system.

Also depicted in FIGS. 1A-1C are autonomous vehicles (104A, 104B). In the illustrated embodiment, autonomous vehicles (104A, 104B) may comprise a vehicle equipped with various sensors (106A-106H). Examples of an autonomous vehicle are described more fully in connection with FIG. 9, the description of which is incorporated herein by reference in its entirety. While illustrated as two autonomous vehicles (104A, 104B), the number of autonomous vehicles is not intended to be limiting.

Each autonomous vehicle (104A, 104B) includes a plurality of sensors (106A-106H). Examples of sensors includes cameras, Lidar, sonar, radar, and other various sensors required for the operation of autonomous vehicles (104A, 104B). As known in the art, sensors (106A-106H) continuously record data of the surroundings of each autonomous vehicle (104A-104B) while the autonomous vehicles (104A, 104B) are operating. Data from these sensors (106A-106H) are transmitted to one or more processing devices installed within the autonomous vehicles (104A, 104B).

FIGS. 1A-1C additionally illustrate a person in distress (108) as well as a person of interest (110). In one embodiment, persons (108, 110) represent a dangerous situation whereby person (110) may be attacking or otherwise harming person (108). In some embodiments, only a person in distress (108) may be present. In this embodiment, the person in distress (108) may be experiencing a medical emergency or other emergency causing them distress.

As will be described in more detail herein, the scenario depicted in FIGS. 1A-1C represents one scenario where autonomous vehicles (104A, 104B) may be used to assist a person in distress or, alternatively, apprehend person of interest (110). Details of these operations are described more fully herein.

FIG. 1B illustrates an alternative scenario versus that depicted in FIG. 1A. In this embodiment, the person of interest (110) is operating autonomous vehicle (104A). Additionally, autonomous vehicle (104B) is within range of autonomous vehicle (104A) and may be configured to take control of autonomous vehicle (104A). Examples of utilizing autonomous vehicle (104B) to control autonomous vehicle (104A) are described in more detail herein.

FIG. 1C illustrates an alternative scenario versus that depicted in FIGS. 1A and 1B. In this scenario, multiple autonomous vehicles (104A-104D) equipped with sensors (106A-106P) surround a non-autonomous vehicle (112) operated by a person of interest (110). In this embodiment, the autonomous vehicles (104A-104D) may be driverless and may be controlled by a remote data center. In the illustrated scenario, the autonomous vehicles (104A-104D) coordinate movements to "box in" the vehicle (112) of the person of interest (110). Examples of utilizing autonomous vehicles (104A-104D) to surround a vehicle (112) are described in more detail herein.

Figure 2:
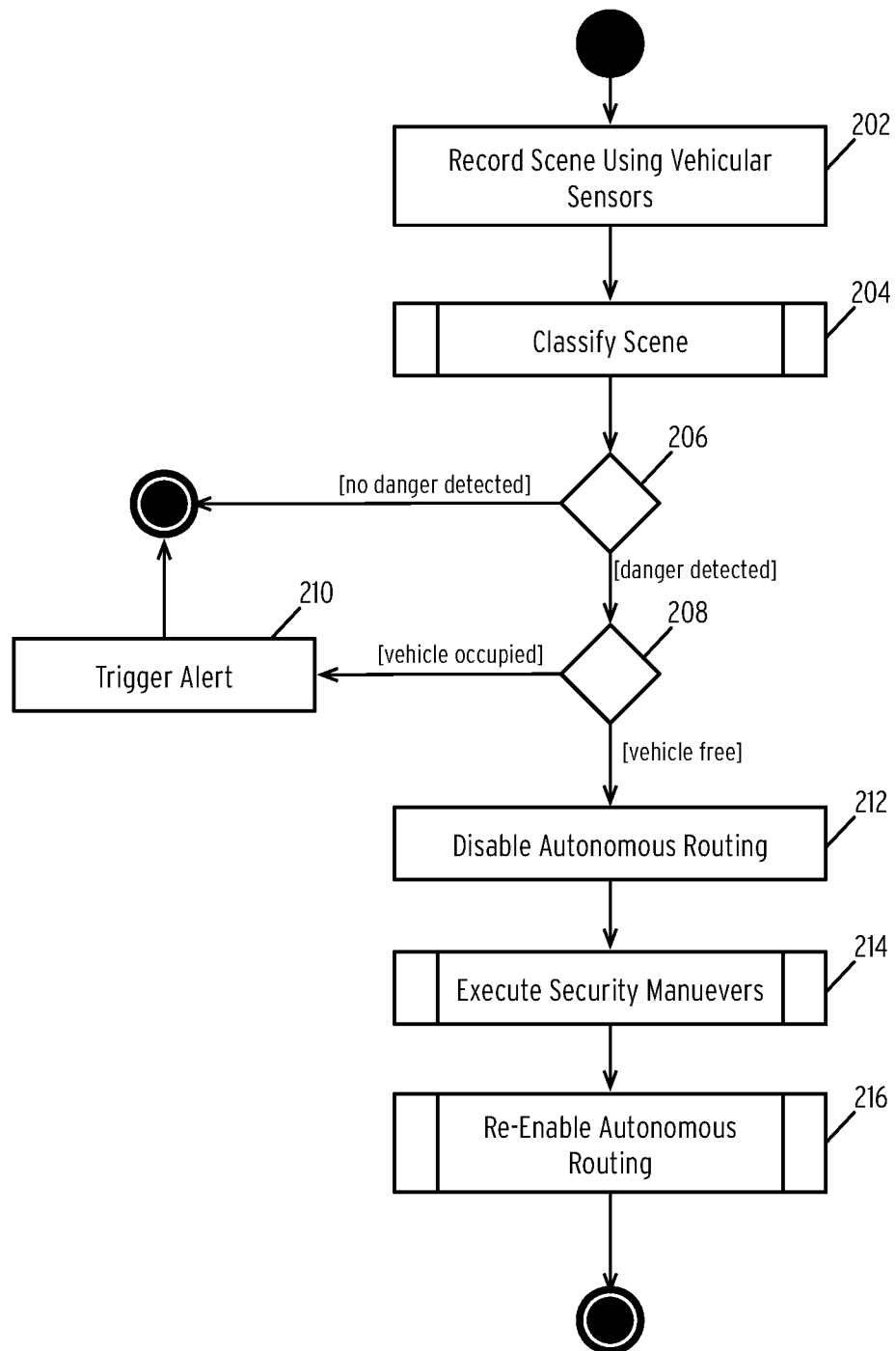
FIG. 2 is a flow diagram illustrating a method for providing autonomous vehicle assistance according to some embodiments of the disclosure.

FIG. 2 is a flow diagram illustrating a method for providing autonomous vehicle assistance according to some embodiments of the disclosure.

In step 202, the method records a scene using vehicular sensors.

In one embodiment, the sensors used in step 202 include digital cameras. In some embodiments, additional sensors may be used in conjunction with digital cameras such as Lidar, radar, sonar, and various other sensors discussed in more detail in the description of FIG. 9. In general, the method records images at preset intervals. In some embodiments, these intervals may be configured based on experimentation. For example, in one embodiment the method may record digital images using a digital camera every millisecond. The specific interval used to capture images is not intended to be limiting.

In some embodiments, the method may capture images using multiple cameras. In this embodiment, the method may coordinate the images from multiple cameras and create a panoramic image using the multiple images. For example, an autonomous vehicle may include multiple cameras positioned through the autonomous vehicle to allow for a 360-degree field of view.

In some embodiments, additional sensors may be used to supplement the digital images. For example, in one embodiment where Lidar sensors are used, the method may coordinate the timing of digital camera images with Lidar readings to generate a three-dimensional model of a scene at a given moment around an autonomous vehicle.

Alternatively, or in conjunction with the foregoing, in step 202, the method may record images of scene using fixed cameras. Fixed cameras refer to stationary cameras situated at a given location. In these embodiments, the fixed cameras may be associated with a geographic location (e.g., a latitude and longitude). In this embodiment, the method may equally utilize images from multiple cameras based on the individual camera locations. In this manner, the method may also create a panoramic image using the fixed cameras by identifying images capturing a field of view nearby a target coordinate.

In general, after executing step 202, the method forwards one or more images (which may be two-dimensional or three-dimensional) for further processing.

Figure 3:
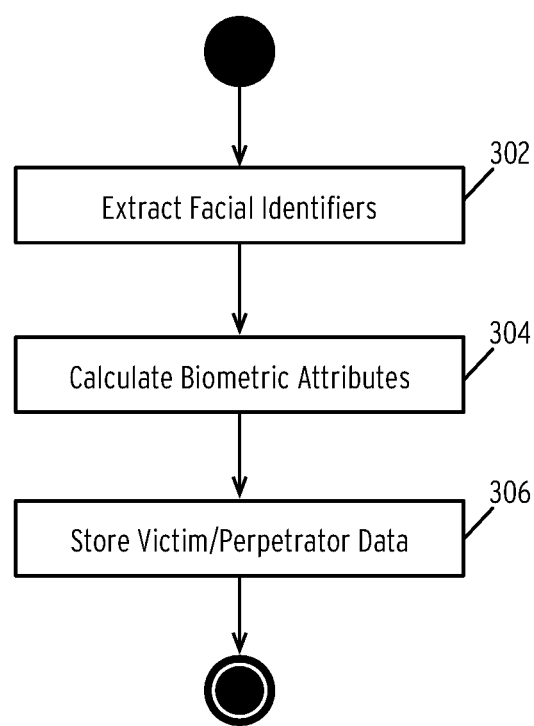
FIG. 3 is a flow diagram illustrating an optional post-processing procedure for classifying images containing potential dangerous scenes according to some embodiments of the disclosure.

In step 204, the method classifies the images received from step 202. FIG. 3 describes additional steps undertaken during the classification of images, the description of which is incorporated herein by reference in its entirety. The use of an "image" in the description of step 204 refers to either a two-dimensional image or three-dimensional image. Additionally, the term image may refer to a stream of images.

In general, step 204 determines whether a given image contains a person in distress. In one embodiment, the method may first determine whether an image is present. Next, the method may classify that identified person as either a person in distress or not a person in distress. In some embodiments, these two stages may be combined as a single detection step. However, in some embodiments, the method may utilize multiple classifiers in order to reduce processing loads. That is, the method may utilize a third-party person detection classifier to act as a gating function and only forward those images with persons in them to a custom-designed machine learning system for further intensive processing.

At a high-level, the method in step 204, utilizes machine learning to detect whether a given image include a person in distress. Various techniques may be used to implement a machine learning detection method. In one embodiment, the method may utilize one or more convolutional neural networks (CNNs), deep neural networks (DNNs), or other classifying algorithms. As known in the art, these machine-learning systems take a given input and classify, with a degree of confidence, whether the input matches a defined pattern.

Here, the input comprises an image and the defined pattern comprises whether the image include a person in distress. In order to operate, a machine learning system must be trained. In general, training a machine learning system comprises providing the machine learning system with a number of known classified images. For example, the machine learning system used in the method may be trained using a set of images of persons in distress. At a high level, and using a neural network as an example, the neural network analyzes portions of the images using "nodes" representing the neural network. When analyzing classified images, the method determines the optimal weights of these nodes. The number of node used may be determined based on experimentation and the disclosure does not limit the specific configuration of a given neural network, or other machine learning system.

In step 206, the method analyzes the output of the classification processing step 204 and determines whether the classification indicates that danger is present. As used herein, danger may refer to a person in distress. For example, a person in distress may be a victim of an assault or a person experiencing a medical emergency.

In one embodiment, the decision in step 206 is based on a binary classification. For example, the output of step 204 may comprise a binary indication of whether the captured image includes a danger. Alternatively, the decision in step 206 may be based on a continuous output. For example, the method, in step 204, may output a probability that the image includes a person in distress. In this case, the method, in step 206, may determine whether the probability exceeds a given threshold (e.g., 50%). The specific threshold may be set based on, and further refined by, analyzing whether the predicted data was in fact accurate.

If the method determines that no danger is present, the method ends. As described above, the method may utilize this determination to refine the training process. For example, the image resulting in no danger detected may be used as a training data point for further refinement of the machine learning system. In some embodiments, the method may only refine the machine learning system with images having a low probability (e.g., below a threshold of 15%). In some embodiments, the method may transmit the classified images to a network operations center for further refine. Alternatively, or in conjunction with the foregoing, the method may store the image for batch processing to refine the machine learning system. In some embodiments, the method may refine the machine learning system "on the fly" as images are classified.

If the method detects danger in the classified images, the method proceeds to step 208.

In step 208, the method determines if a vehicle is free or occupied. As used herein a vehicle may be "free" if there are no occupants in the vehicle. Conversely, a vehicle is occupied if an occupant is present within the vehicle. While step 208 may, in some instances, be optional, in general, the method confirms that a vehicle is free to ensure that no occupants are subject to the detected danger. In some embodiments, the method may only execute step 208 for persons in distress and may bypass the step of detected situation that pose no clear threat to an occupant. For example, a person experiencing a medical emergency may not pose a threat to an occupant. In alternative embodiments, the method may perform the inverse of step 208 and may identify whether an occupant may be in a position to assist with the detected danger. For example, the method may know that the occupant is a medical professional. In one embodiment, the occupant may be a medical professional using an autonomous vehicle as a taxi. In this case, the occupant may have a user profile used for hailing the autonomous vehicle that indicates they are a medical professional. In this scenario, the method may leverage the occupants' background to provide additional services to a person detected as experiencing a medical emergency.

If the method decides, for the reasons set forth above, not to proceed in providing assistance, the method may trigger one or more alerts in step 210.

Alerts may comprise various types of alerts. Details regarding some of these alerts (e.g., alarms, emergency calls) are described in more detail in FIG. 4, the disclosure of which is incorporated by reference.

In one embodiment, the method may sound an alarm on the vehicle while near the detected danger. In one embodiment, this may comprise triggering the horn of the autonomous vehicle using the control unit associated with the horn. Alternatively, or in conjunction with the foregoing, the method may trigger the headlights or other lights of the vehicle using an associated control unit. Alternatively, or in conjunction with the foregoing, the method may trigger a siren if the autonomous vehicle is equipped with a siren. Alternatively, or in conjunction with the foregoing, the method may modify the speed of the vehicle to deter a dangerous situation. In some embodiments, the method may modify the route or varying the trajectory of the vehicle to "swerve" at a dangerous situation in order to deter a potential attacked. Note that each of the above examples may be performed simultaneous and may optionally only be performed if the method detects that the danger involves an assailant or attacker (versus a medical emergency).

Alternatively, or in conjunction with the foregoing, the method may execute an emergency alert procedure. In one embodiment, this procedure may involve dialing an emergency number (e.g., 911 in the United States) or a local police, fire, or ambulance number. In this embodiment, the method may generate, using text-to-speech, a description of the location and the event. For example, upon detecting a person in distress and classifying that person as a person being attacked by an assailant, the method may generate the string "A person is being assaulted at (coordinates). This is an automated message," where the coordinates are the latitude and longitude. Alternatively, the method may use the coordinates to pinpoint a location such as an intersection and generate a string "A person is being assaulted at the corner of eighteenth street and seventh avenue in new york, new york. This is an automated message." In some embodiments, the emergency signal may comprise an API call to an emergency service. In this embodiment, the method may generate a message in a similar fashion conforming to the API requirements.

If the method determines that the autonomous vehicle should respond to the detected danger, the method first disables any autonomous routing in step 212.

In one embodiment, the autonomous vehicle executing the method in FIG. 2 may be configured to travel along a predetermined route. For example, the autonomous vehicle may be delivering a package to a defined destination. Thus, in step 212 the method disables the current trajectory and routing of the autonomous vehicle.

In step 214, the method executes one or more security maneuvers in response to determining that a danger exists and the autonomous vehicle can respond to the danger. Specific processes for executing a security maneuver are described more fully in the description of FIG. 4, the disclosure of which is incorporated herein by reference in its entirety.

In one embodiment, the method may reroute the autonomous vehicle to the detected danger and trigger an audible alarm (e.g., a horn or siren as discussed previously). In this embodiment, the method calculates the distance to the danger using a Lidar, radar, or sonar sensor. The method may then transmit instructions to the engine control unit (ECU) and/or other systems to move the vehicle closer to the detected danger.

In another embodiment, the method may transmit an emergency signal by, for example, dialing an emergency number (e.g., 911 in the United States). Details of this operation are described more fully above, the details incorporated herein by reference in their entirety.

In another embodiment, the method may transmit instructions to the engine control unit (ECU) and/or other systems to move the vehicle closer to the detected danger (e.g., using Lidar, radar, and/or sonar measurements). The method may then unlock and/or open a door of the autonomous vehicle in order to allow the person in distress to enter the vehicle.

In some embodiments, some or all of these embodiments may be executed simultaneously.

In step 216, the method re-enables autonomous routing after executing the security maneuvers.

In some embodiments, the method may reestablish the route undertaken by the autonomous vehicle prior to disabling the autonomous routing in step 212. In some embodiments, the method may additionally identify a new waypoint as a stopping point to allow a passenger to exit the vehicle. In some embodiments, the method may receive a desired waypoint from the passenger themselves. In other embodiments, the method may re-route the autonomous vehicle to the nearest police station or hospital using a high-definition map installed in the autonomous vehicle. Details of these operations are described more fully in the description of FIG. 5, which is incorporated by reference in its entirety.

Figure 4:
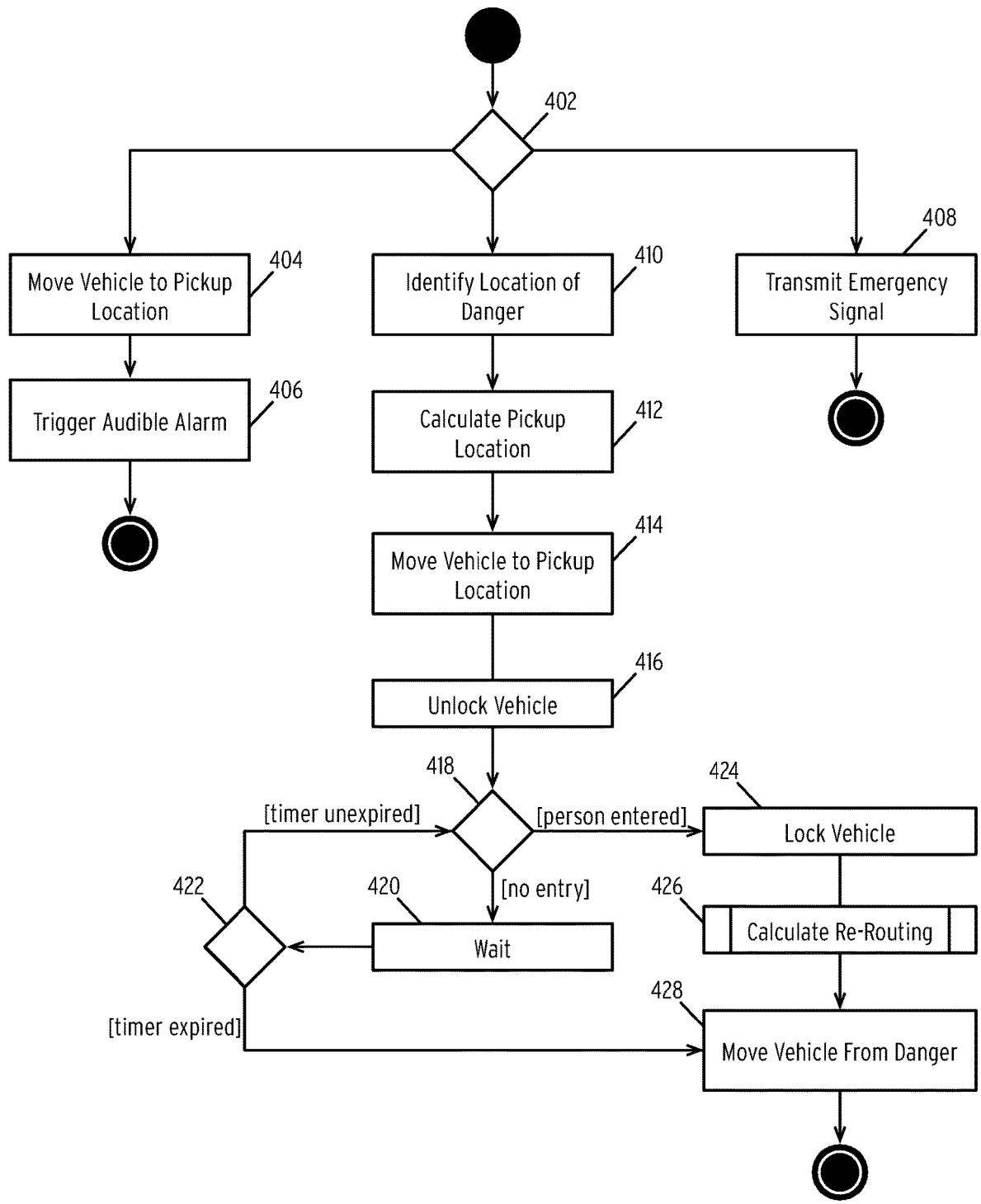
FIG. 4 is a flow diagram illustrating a method for executing security maneuvers in response to a detected threat according to some embodiments of the disclosure.
Figure 5:
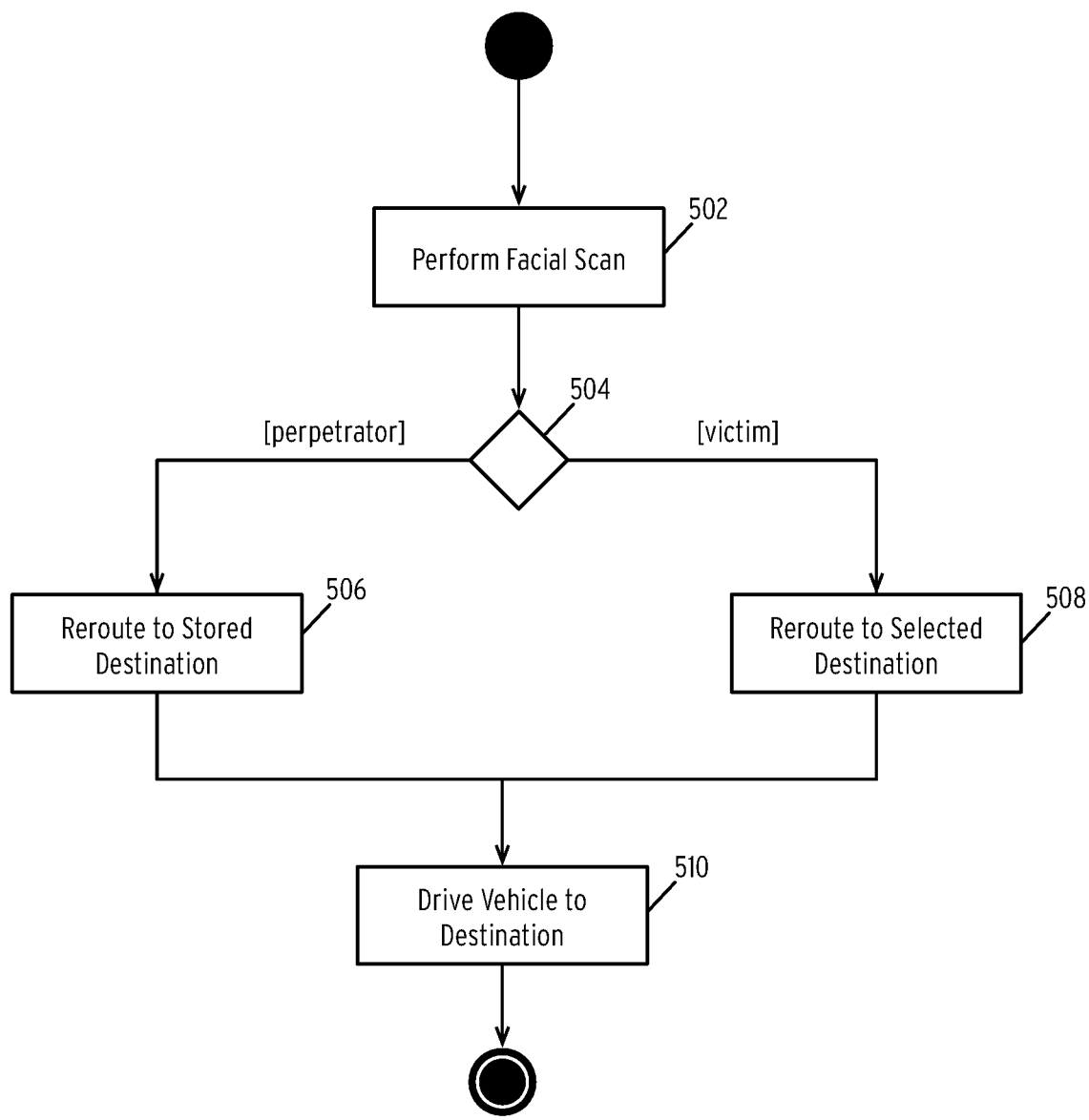
FIG. 5 is a flow diagram illustrating a method for calculating a re-routing destination according to some embodiments of the disclosure.

As illustrated in the above description of FIG. 2, the disclosed embodiments provide multiple ways to utilize existing autonomous vehicle hardware in combination with application-specific machine learning systems and related software to provide autonomous vehicle assistance to persons in distress. FIGS. 3 through 5, discussed below, provide further technical detail on how various aspects of these steps may be implemented.

FIG. 3 is a flow diagram illustrating an optional post-processing procedure for classifying images containing potential dangerous scenes according to some embodiments of the disclosure.

In one embodiment, the method illustrated in FIG. 3 may be executed after classifying one or more images in step 204 illustrated in FIG. 2. The results of the processing FIG. 3 may be used to supplement additional operations (discussed in later Figures).

In step 302, the method extracts facial identifiers from a given classified images.

As discussed previously, the method in FIG. 2 may identify an image (or images) that includes a potentially dangerous scene (e.g., an assault). Alternatively, the classified image may include a person experiencing a medical emergency. In step 302, the method attempts to extract a facial identifier of the individuals included within the captured image.

In one embodiment, the method may utilize a machine learning system (e.g., a CNN or DNN) to extract a facial portion of the images classified in FIG. 2. Alternatively, or in conjunction with the foregoing, the method may associate a given facial identifier with a particular person in the images. For example, the method may assign separate facial identifiers to a victim and an assailant. In some embodiments, the facial detection process may comprise extracting a portion of the classified image and assigning that portion to a given person. In some embodiments, the method may further tag a given portion with a person type (e.g., assailant, victim, etc.). In some embodiments, as part of the facial identification procedure, the method may transform the portion to obtain a centered facial image (e.g., using affine transformations).

In step 304, the method calculates biometric attributes of a given person in a classified image.

In one embodiment, biometric attributes comprise physical attributes of a person identifier in a given classified image. Biometric attributes may comprise geometric attributes such as a person's estimated height, weight, build, gender, etc. Biometric attributes may also comprise attributes such as hair color, skin tone, eye color. Biometric attributes may additionally comprise features such as hair length, the presence of facial hair, clothing types and colors, etc. In some embodiments, machine-learning systems such as CNNs may likewise be used to categorize each of the biometric identifiers.

After identifying the biometric identifiers, the method may associate each extract identifier (including a confidence level of each identifier) with the previously extracted facial identifiers. In this manner, the method generates a data structure that represents each person in the classified image that may be used in downstream processing.

In step 306, the method stores the facial identifiers and biometric attributes for later processing.

In one embodiment, the method stores this data locally on a storage device of the autonomous vehicle. Alternatively, or in conjunction with the foregoing, the method may transfer this information (e.g., using a cellular or satellite connection) to a remote data processing center.

As will be discussed in more detail herein, the facial identifiers and biometric attributes may be used by downstream processes to determine the types of actions to perform and/or whether to perform any action at all. For example, the use of facial and biometric identifiers may be used to generate a description of an assailant that may be transmitted to authorities. Alternatively, or in conjunction with the foregoing, the use of facial identifiers may be used to determine whether to allow access to the vehicle to a given person (e.g., to a victim but not an assailant).

FIG. 4 is a flow diagram illustrating a method for executing security maneuvers in response to a detected threat according to some embodiments of the disclosure.

In step 402, the method determines which security maneuver to execute. In some embodiments, the method may select a single security maneuver while in other embodiments, the method may select each security maneuver or a subset of all security maneuvers to execute. In the illustrated method, three security maneuvers comprise steps 404-406, step 408, and steps 410-428 are illustrated although other maneuvers may be executed.

In step 404, the method executes a first security maneuver by moving a vehicle to a pickup location and, in step 406, triggering an audible alarm.

In step 404, the method identifies the geographic coordinates of a dangerous situation. In one embodiment, this step comprises first identifying the camera that generated the image containing a dangerous scene and determining a direction of the dangerous situation. In some embodiments, a given camera may include parameters defining the field of view of the camera (e.g., front, driver-side). Next, the method may use a Lidar, radar, or sonar sensor to calculate the distance to the dangerous situation. The distance and direction of the danger may be utilized to pinpoint the exact coordinates of the dangerous scene.

Additionally, the method may further utilize a high-definition map to calculate a route to the danger. For example, the method may calculate a route to the specific location using the map that includes details regarding roadways accessible by the autonomous vehicle.

In step 406, the method triggers an audible alarm upon reaching the identified location of the danger. In one embodiment, the method transmits instructions to the engine control unit (ECU) and/or other systems to move the vehicle closer to the detected danger.

In step 408, the method executes a second security maneuver by transmitting an emergency signal.

In one embodiment, step 408 may involve dialing an emergency number (e.g., 911 in the United States) or a local police, fire, or ambulance number. In this embodiment, the method may generate, using text-to-speech, a description of the location and the event. For example, upon detecting a person in distress and classifying that person as a person being attacked by an assailant, the method may generate the string "A person is being assaulted at (coordinates). This is an automated message," where the coordinates are the latitude and longitude. Alternatively, the method may use the coordinates to pinpoint a location such as an intersection and generate a string "A person is being assaulted at the corner of eighteenth street and seventh avenue in new york, new york. This is an automated message." In some embodiments, the emergency signal may comprise an API call to an emergency service. In this embodiment, the method may generate a message in a similar fashion conforming to the API requirements.

In step 410, the method executes a third security maneuver by identifying the location of the danger. The method then calculates a pickup location in step 412 and moves the vehicle to the pickup location in step 414. In some embodiments, the identification of the danger and movement of an autonomous vehicle may be performed using a combination of camera field of view and Lidar, radar, or sonar detection as discussed previously in connection with step 404, the disclosure of which is incorporated herein by reference in its entirety.

In step 416, the method unlocks the vehicle. In one embodiment, the method may transmit a signal to an ECU instructing the autonomous vehicle to unlock the doors upon reaching the pickup location. Alternatively, or in conjunction with the foregoing, the method may trigger an audible alarm (discussed in step 406) while unlocking the doors.

In step 418, the method determines if a person enters the vehicle.

In one embodiment, the method may determine that a person has entered the vehicle by monitoring the ECU to determine if an open-door signal was received.

If the method determines that a door was not opened (step 418), the method continues to wait (step 422). In the illustrated embodiment, the method may additionally determine whether a predefined timer has expired (step 422).

If the timer has not expired, the method continues to monitor the ECU for the triggering of an open-door signal (step 418). Alternatively, if the method determines that the timer has expired (step 422) without receiving the open-door signal, the method may move the vehicle from danger (step 428, discussed herein).

Alternatively, if the method determines that the open-door signal is received, the method may verify that a person has entered the autonomous vehicle (step 418). In one embodiment, the method verifies that a person has entered the autonomous vehicle by utilizing one or more camera devices installed within the autonomous vehicle. In one embodiment, the autonomous vehicle may have cameras recording locations within the autonomous vehicle that persons may occupy. For example, the autonomous vehicle may have cameras facing the drivers, passenger, and rear seats of the vehicle. Alternatively, or in conjunction with the foregoing, the autonomous vehicle may be equipped with one or more motion sensors or weight sensors to determine whether a passenger has entered the vehicle and has sat on a given seat, respectively. Each of these sensors may be utilized to confirm that a person has entered the vehicle.

In one embodiment, the method may utilize one or more internal cameras to determine whether the person, or persons, entering the vehicle correspond to a victim or person in distress. In this embodiment, the method may extract facial identifiers and/or biometric attributes of the persons entering the autonomous vehicle to confirm the presence of a victim or person in distress. Calculation of facial identifiers and/or biometric attributes may be performed in a similar manner to that described in the description of FIG. 3, the disclosure of which is incorporated herein by reference in its entirety.

Once the method confirms the proper individual has entered the vehicle, the method locks the vehicle doors in step 424. In one embodiment, the method may transmit a signal to the appropriate ECU instructing the autonomous vehicle to lock all of the doors of the vehicle.

In step 426, the method calculates a new route after securing the new passengers.

In one embodiment, the method may allow the passengers to enter a designated location and calculate the routing based on this location. Alternatively, the method may automatically calculate a route based on the type of danger detected. Details of calculating a route are described more fully in the description of FIG. 5, the disclosure of which is incorporated by reference in its entirety.

In step 428, the method moves the vehicle from danger.

In one embodiment, the method may transmit routing information to one or more ECUs to autonomously move the vehicle to a predetermined location. For example, the method may operate the autonomous vehicle to move the vehicle a predetermined distance from the dangerous location (e.g., one kilometer, 2000 feet, etc.). In another embodiment, the method may calculate a longer route to a predetermined location such as a location specified by the passenger or a predetermined location such as a hospital or police station.

FIG. 5 is a flow diagram illustrating a method for calculating a re-routing destination according to some embodiments of the disclosure.

In step 502, the method performs a facial scan of a passenger entering an autonomous vehicle to obtain a facial identifier of the passenger. Details of generating a facial identifier are described more fully in previous Figures, the disclosure of which is incorporated herein by reference in its entirety.

In step 504, the method determines whether the facial identifier generated in step 502 corresponds to a victim or a perpetrator.

As described more fully in the description of FIG. 3, the method may store a listing of facial identifiers and their associated with person types in a recorded image. Thus, the method stores a mapping of facial identifiers to types of actors in an image (e.g., a victim or perpetrator of an assault). In step 504, the method obtains a facial identifier of the passenger and determines whether the facial identifier matches one of these stored identifiers. In some embodiments, the method may require the passenger re-position himself or herself to obtain a clear photo. In other embodiments, the method may utilize a confidence level that the passenger corresponds to a known facial identifier. In general, the method determines the type of passenger in order to determine how to instruct the autonomous vehicle to respond.

In step 506, the method re-routes the autonomous vehicle to a stored destination.

As illustrated, step 506 may be executed upon determining that the person is a perpetrator of a danger (e.g., an assailant). In this embodiment, the person entering the vehicle should be treated as a hostile party. In this embodiment, the method extracts the location of a police station or other pre-stored location to deliver the passenger. In another embodiment, the method may not re-route the vehicle and may proceed to trigger an alarm while detecting that the perpetrator is still in the vehicle. In conjunction with step 506, the method may dial an emergency number and inform authorities that the passenger is a potential criminal. In this embodiment, the method may enable authorities to instruct the vehicle of the appropriate destination. Alternative, in some embodiments, the method may simply lock the vehicle and remain stationary while authorities are alerted of the vehicle's location.

Alternatively, in step 508, the method may detect that the passenger is a victim or a person in distress and allow the user to enter a desired location.

As described above, in some embodiments, the desired location may be manually entered by a user. Alternatively, the desired location may comprise a location a preset distance away from the scene of the danger to enable the person to escape. In another alternative, the method may automatically route the person to the nearest medical center or hospital if the person is detected as experiencing a medical emergency.

In step 510, the method drives the autonomous vehicle to the identified location. As described above, driving the vehicle may comprise calculating routing information and instructing the ECUs of the autonomous vehicle to drive the vehicle to the identified location.

As illustrated in FIG. 5, the method utilizes facial scanning to determine how to respond to a passenger. If the passenger is a "bad actor" (e.g., a criminal), the method may lock the passenger in the vehicle and alert authorities (or deliver the vehicle to authorities). Alternatively, if the passenger is an "innocent actor" the method may facilitate their escape from a dangerous situation and delivery to a safe location.

Figure 6:
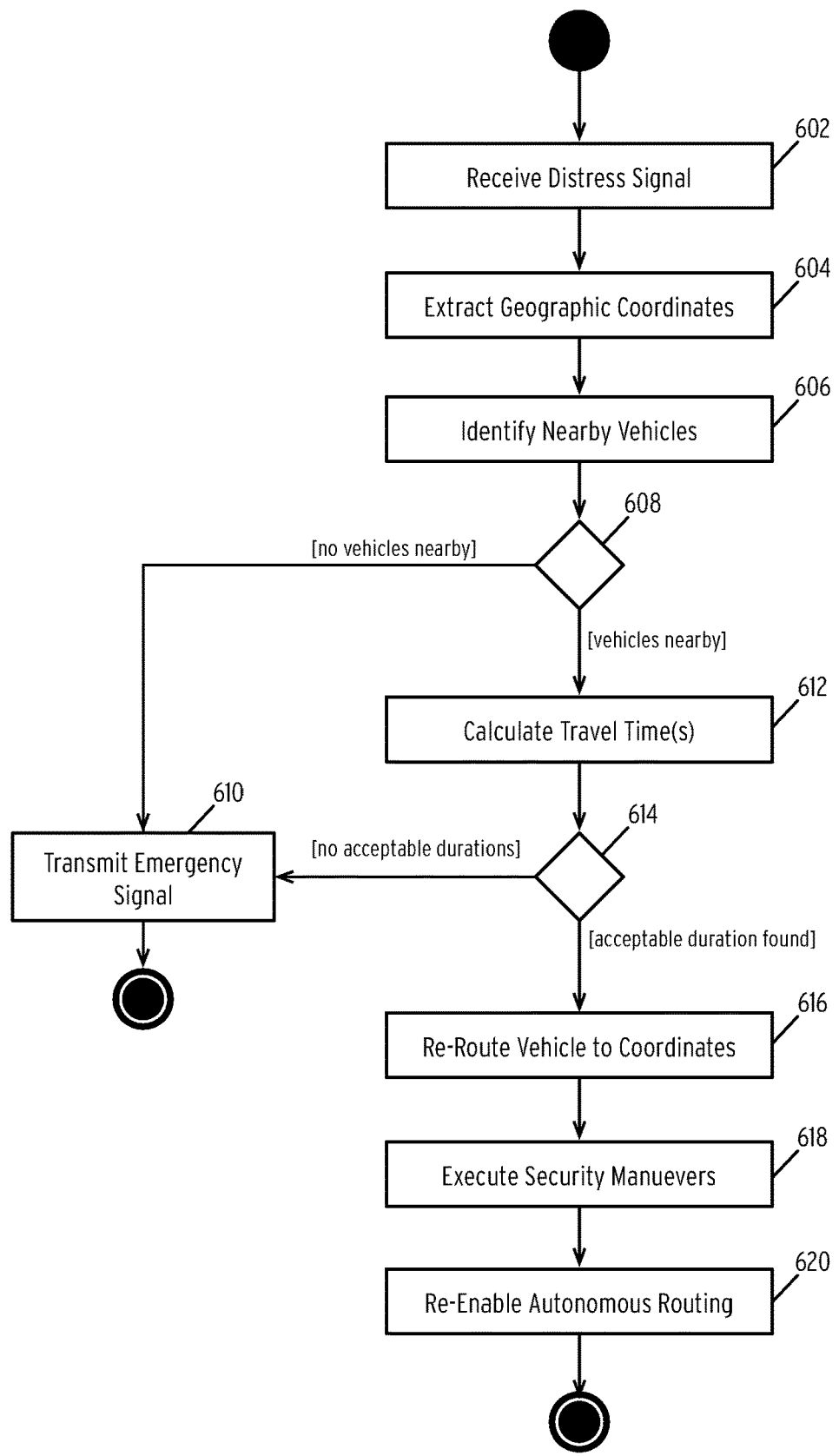
FIG. 6 is a flow diagram illustrating a method for routing autonomous vehicles to distress signals according to some embodiments of the disclosure.

FIG. 6 is a flow diagram illustrating a method for routing autonomous vehicles to distress signals according to some embodiments of the disclosure.

In step 602, the method receives a distress signal.

In some embodiments, the distress signal may comprise a signal received from authorities (e.g., emergency services) that includes a geographic location of a person in distress. In some embodiments, these coordinates may be extracted from the GPS of a mobile device and/or by an identification of a cellular tower servicing the mobile device. In alternative embodiments, the distress signal may be received via an application stored on a user's mobile phone.

Alternatively, or in conjunction with the foregoing, the distress signal may be received via a centralized processing system receiving camera feeds from stationary positions or from autonomous vehicles. As illustrated in FIGS. 1A-1C, various stationary cameras may be configured to record street-level images and these images may be classified (e.g., using a machine learning system as discussed previously) to detect dangerous situations.

In step 604, the method extracts geographic coordinates of the distress signal.

In one embodiment, the method may extract the coordinates by extracting the raw coordinate data from the signal. Alternatively, the method may extract coordinates from a plaintext description of a location using a mapping database.

In step 606, the method identifies vehicles near to the extracted coordinates.

In some embodiments, a fleet of autonomous vehicles may periodically transmit their locations to a centralized system. Alternatively, the method may be configured to ping each autonomous vehicle in a fleet to determine their locations. In some embodiments, the method may transmit a set of coordinates and a condition (e.g., "within 2 km") to identify a listing of candidate autonomous vehicles. The method, in step 606, determines a listing of autonomous vehicles that are within a predefined distance from the coordinates associated with the distress signal.

In step 608, the method determines if any vehicles are nearby the distress signal coordinates. In one embodiment, this comprises determining whether the number of vehicles identified in step 606 is greater than zero.

In step 610, the method transmits an emergency signal if no vehicles are within a predetermined distance of the distress signal coordinates. Details regarding the transmission of emergency signals are described more fully in previous Figures, the disclosure of which is incorporated by reference in its entirety.

If one or more autonomous vehicles are within a predefined distance from the coordinates of the distress signal, the method calculate routes for each autonomous vehicle (step 612) and determines whether the estimated travel time is below a pre-defined threshold time (step 614). If no vehicles can travel to the destination within a pre-defined threshold time, the method may classify these autonomous vehicles as unavailable and proceed to transmit an emergency signal in step 610.

After identifying an autonomous vehicle that can respond to the distress signal and confirming that the autonomous vehicle can reach the coordinates associated with the distress signal in time, the method re-routes a vehicle to the coordinates of the distress signal in step 616.

In one embodiment, the method may re-route the closest autonomous vehicle to the coordinates of the distress signal. Alternatively, the method may re-route more than one of the available autonomous vehicles to the coordinates. In one embodiment, the method may transmit the coordinates to each autonomous vehicle whereby the autonomous vehicle calculates the fastest route to the coordinates.

In step 618, each of the autonomous vehicles re-routed to the coordinates execute one or more security maneuvers.

The details of executing security maneuvers is described more fully in the description of FIG. 4, the description incorporated herein by reference in its entirety.

In set 620, the method re-enables autonomous routing. Re-enabling autonomous routing is described more fully in FIG. 2 (step 216) and FIG. 5, the description of each incorporated herein by reference in its entirety.

As illustrated in FIG. 6, an alternative embodiment is illustrated whereby the initial detection of a danger may be performed by cameras other than (or in conjunction with) cameras of an autonomous vehicle. The illustrated embodiment may provide further emergency coverage for areas where autonomous vehicles are not actively in motion or operating. Thus, the use of standard, fixed cameras supplements (or may replace) steps 202-208 in FIG. 2.

Figure 7:
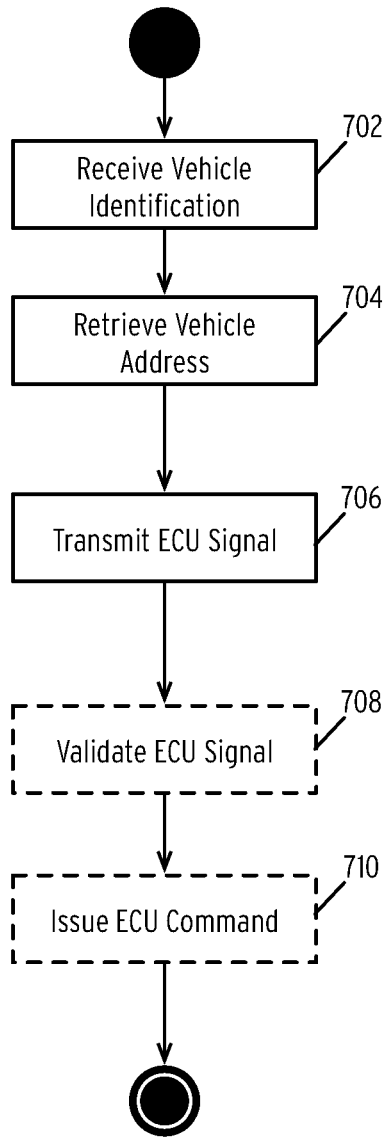
FIG. 7 is a flow diagram illustrating a method for disabling an autonomous vehicle according to some embodiments of the disclosure.

FIG. 7 is a flow diagram illustrating a method for disabling an autonomous vehicle according to some embodiments of the disclosure.

In step 702, the method receives an identification of a vehicle.

In some embodiments, the identification of the vehicle may comprise a vehicle identification number. Alternatively, or in conjunction with the foregoing, the identification may comprise a license plate number. In general, the identification comprises any unique identifier associated with an autonomous vehicle.

In step 704, the method retrieves a vehicle address associated with the autonomous vehicle.

In some embodiments, the address of the vehicle may comprise an IP address or similar identifier. In some embodiments, the vehicle identification and the vehicle address may comprise the same identifier. In step 704, the method converts the identification to an address. For example, if the identification is a license plate number, the method may query a database of autonomous vehicle license plates to obtain a communications address (e.g., IP address) to connect to the autonomous vehicle.

In alternative embodiments, the identification may comprise a description of the vehicle. For example, the identification may comprise a make/model of a vehicle and an estimate of a location. In this embodiment, the method may query a fleet of autonomous vehicles to identify a vehicle matching the description and retrieve an address with the vehicle. Similarly, the description of the autonomous vehicle may include operating characteristics of the autonomous vehicle. For example, a description may comprise a "black SUV traveling north on seventh avenue in new york, new york travelling at a high rate of speed." In this embodiment, the method first identifies all black SUVs and filters this list based on a recently reported location (or a query response). The method may then filter this list again based on reported operating characteristics (e.g., speed and direction) of the vehicles.

In step 706, the method transmits an ECU signal to the identified vehicle at the identified address.

In one embodiment, the ECU signal may comprise a stop engine command. In other embodiments, the method may issue multiple signals in order to "take control" of the vehicle. Thus, in some embodiments, steps 706-710 may be executed repeatedly. In the illustrated embodiment, the ECU signal(s) may be issued over a wide area network. Alternatively, the ECU signals may be transmitted by nearby autonomous vehicles.

In step 708, the method validates the ECU signals and, in step 712, the method issues the ECU command included within the signal to the associated ECU. As illustrated, step 707 and 710 may be performed on the autonomous vehicle identified in steps 702-704.

In some embodiments, the method may validate the ECU command by verifying an electronic signature associated with the signal. In this embodiment, the method may utilize public-key cryptography to ensure that ECU signals are only issued upon verifying that the signals are received from a trusted third party.

In some embodiments, the method may further utilize a sequence identifier to verify that the ECU signals are received in the proper order. In some embodiments, a sequence identifier may be utilized if the autonomous vehicle is receiving additional instructions during operation.

In some embodiments, the method may receive an identification automatically. For example, the method may receive signals generated based on red light cameras or other devices monitoring roadways. In this example, the method may receive a signal that a vehicle has run a red light. The method may verify the identity of the vehicle based on the timestamp of the signal and by extracting a vehicle identification from the image captured when the autonomous vehicle runs the red light. The method may then generate various ECU signals. A first signal may be transmitted to display a notification on a display unit in the vehicle notifying the user that they should pull over. If the user does not comply, subsequent ECU commands may be issued to take control of the vehicle. Subsequent ECU commands may then be issued to pull the autonomous vehicle over and or disable the engine.

As a second example, authorities may issue an amber or silver alert with a given license plate number. The method may then identify an autonomous vehicle corresponding to this license plate number. Next, the method may issue ECU signals to cause the vehicle to lock the doors. Subsequent ECU signals may be issued to move the vehicle out of the flow of traffic (e.g., to the side of a road or to a safe area if no shoulder is available). Next, the ECU may issue a signal to disable the engine and maintain the doors in a locked state. Finally, the method may issue an alert to authorities that the autonomous vehicle has been detained (the details of which are described elsewhere herein and are incorporated by reference in their entirety).

Figure 8:
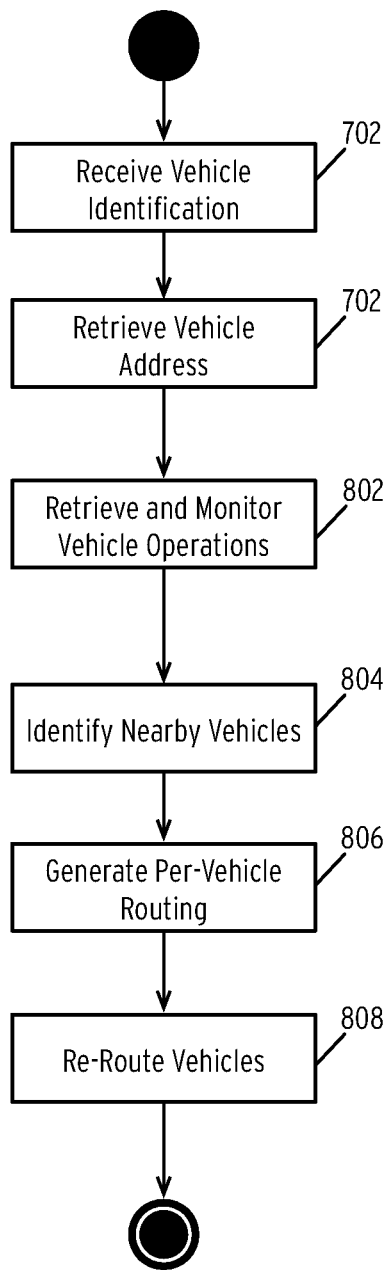
FIG. 8 is a flow diagram illustrating a method for intercepting a vehicle with a fleet of autonomous vehicles according to some embodiments of the disclosure.

FIG. 8 is a flow diagram illustrating a method for intercepting a vehicle with a fleet of autonomous vehicles according to some embodiments of the disclosure.

In step 702 and 704, the method receives a vehicle identification and retrieves a vehicle address. These operations are discussed in the identically numbered steps in FIG. 7, the description of which is incorporated by reference in their entirety.

In step 802, the method retrieves and monitors an autonomous vehicle's operational data. In one embodiment, operational data comprises detail such as the autonomous vehicle's position, speed, current routing, and any information related to the current and future location.

In step 804, the method identifies nearby autonomous vehicles.

In one embodiment, the method may utilize a current location to identify one or more autonomous vehicles nearby to the current location of the vehicle identified in steps 702 and 704. In some embodiments, the method may identify these vehicles by identifying autonomous vehicles that have recently reported locations within a predefined radius of the identified vehicle. In other embodiments, the method may query a fleet of autonomous vehicles to identify current locations of the autonomous vehicles.

In step 806, the method generates per-vehicle routing.

In one embodiment, the method generates a routing policy for each vehicle based on the monitored operational data of the vehicle under inspection. In one embodiment, the routing first includes real-time updated routing to drive an autonomous vehicle from a current location to the live position of the vehicle identified in step 702. Additionally, the routing information may include instructions to trigger the Lidar, radar, and sonar sensors of each vehicle to position the autonomous vehicles nearby the vehicle identified in 702.

In step 808, the method transmits the routing data to the autonomous vehicles and thus re-routes the autonomous vehicles. As described previously, the routing instructions may cause the ECUs of the vehicles to change the current route of the vehicles to define routing policy.

In some embodiments, the method described above may be utilized to "box in" a vehicle identified in step 702. The following description describes this example.

In steps 702, 704, and 802, the method continuously monitors the coordinates of a suspect vehicle. A set of nearby vehicles is identified in step 804. For example, vehicle the method may first check to ensure that the vehicles do not include any passengers. Next, the method re-routes each vehicle to the location of the suspect vehicle. This step may comprise generating a new route that is continuously updated until the autonomous vehicles are within a predefined distance of the suspect vehicle. Once the autonomous vehicles are within a predefined distance of the suspect vehicle, the movements of each autonomous vehicle are coordinated either by a central location or, alternatively, between each vehicle. Specifically, one scenario was depicted in FIG. 1C. In that scenario, four autonomous vehicles were routed to a suspect vehicle (112). Upon reaching the suspect vehicles, the autonomous vehicles may coordinate their positions according to a defined pattern. As illustrated, the pattern in FIG. 1C includes autonomous vehicles in front of and behind the suspect vehicle and an autonomous vehicle on each side of the vehicle. In one embodiment, each autonomous vehicle may utilize one or more sonar sensors to navigate and maintain a position inches from the suspect vehicle. In one embodiment, each autonomous vehicle may then slowly decrease their rate of speed, thus eventually immobilizing the suspect vehicle.

Figure 9:
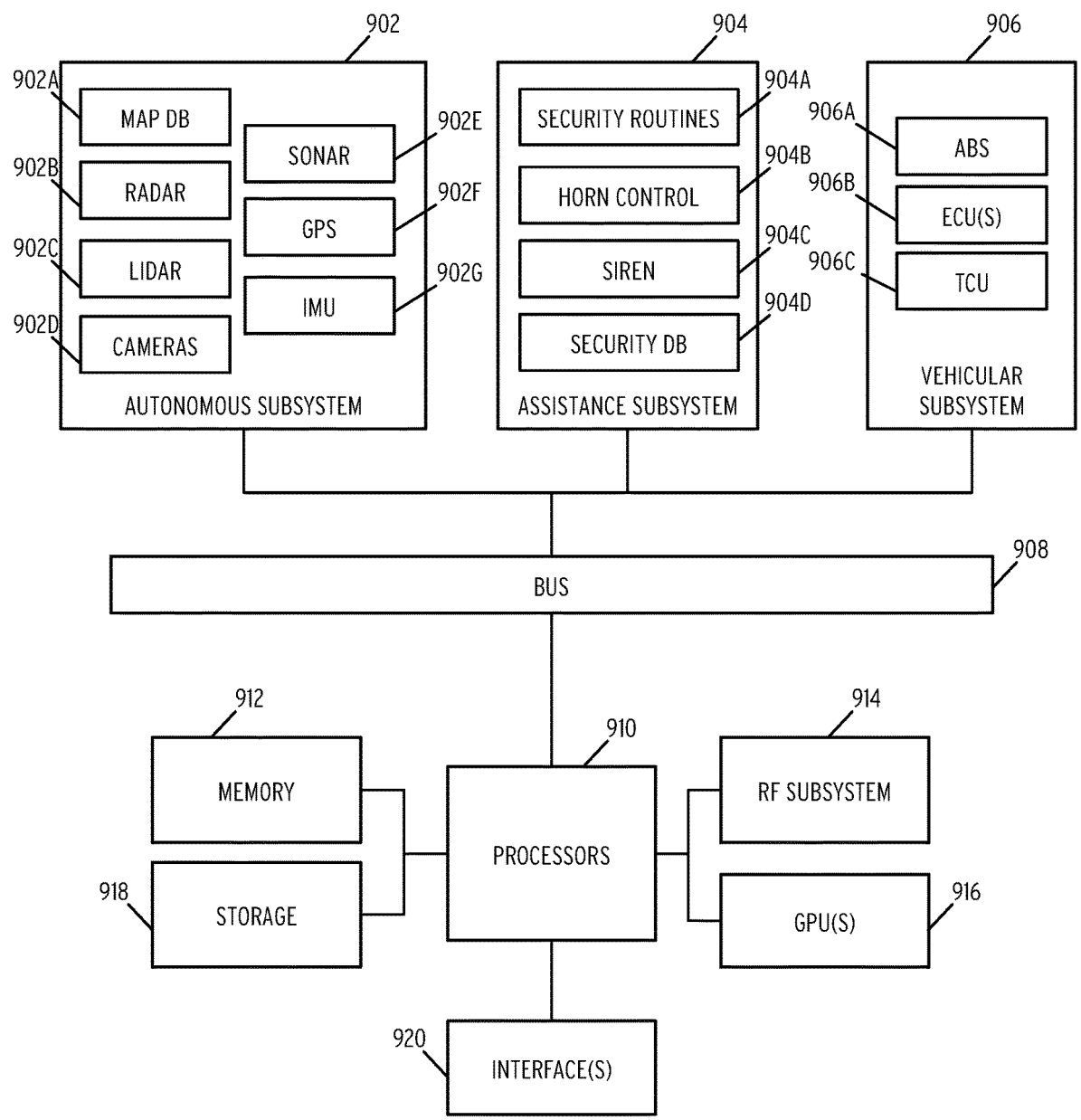
FIG. 9 is a block diagram of an autonomous vehicle according to some embodiments of the disclosure.

FIG. 9 is a block diagram of an autonomous vehicle according to some embodiments of the disclosure.

The system illustrated in FIG. 9 may be installed entirely within a vehicle. In some embodiments, some components (e.g., components and subsystems other than subsystem (904)) may comprise existing autonomous vehicle subsystems.

The system includes an autonomous vehicle subsystem (902). In the illustrated embodiment, autonomous vehicle subsystem (902) includes map database (902A), radar devices (902B), Lidar devices (902C), digital cameras (902D), sonar devices (902E), GPS receivers (902F), and inertial measurement units (902G). Each of the components of autonomous vehicle subsystem (902) comprises standard components provided in most current autonomous vehicles. In one embodiment, map database (902A) stores a plurality of high-definition three-dimensional maps used for routing and navigation. Radar devices (902B), Lidar devices (902C), digital cameras (902D), sonar devices (902E), GPS receivers (902F), and inertial measurement units (902G) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem (906) is additionally included within the system. Vehicular subsystem (906) includes various anti-lock braking systems (906A), engine control units (902B), and transmission control units (902C). These components may be utilized to control the operation of the autonomous vehicle in response to the streaming data generated by autonomous vehicle subsystem (902A). The standard autonomous vehicle interactions between autonomous vehicle subsystem (902) and vehicular subsystem (906) are generally known in the art and are not described in detail herein.

The processing side of the system includes one or more processors (910), short-term memory (912), an RF system (914), graphics processing units (GPUs) (916), long-term storage (918) and one or more interfaces (920).

The one or more processors (910) may comprise central processing units, FPGAs, or any range of processing devices needed to support the operations of the autonomous vehicle. Memory (912) comprises DRAM or other suitable volatile RAM for temporary storage of data required by processors (910). RF system (914) may comprise a cellular transceiver and/or satellite transceiver. Long-term storage (918) may comprise one or more high-capacity solid-state drives (SSDs). In general, long-term storage (918) may be utilized to store, for example, high-definition maps, routing data, and any other data requiring permanent or semi-permanent storage. GPUs (916) may comprise one more high throughput GPU devices for processing data received from autonomous vehicle subsystem (902A). Finally, interfaces (920) may comprise various display units positioned within the autonomous vehicle (e.g., an in-dash screen).

The system additionally includes an assistance subsystem (904) which performs all of the in-vehicle operations described previously (e.g., in connection with FIGS. 2-8). The assistance subsystem (904) includes a plurality of security routines (904A). These routines (904A) correspond to the sets of maneuvers to execute upon detecting an emergency (described previously). In one embodiment, these routines may be updated dynamically by a centralized autonomous vehicle provider (described in FIG. 10). Assistance subsystem (904) additionally includes a horn control module (904B) and a siren control module (904C), which may trigger a horn or audible siren, respectively, of the vehicle as described previously. Finally, the assistance subsystem (904) includes a security database (904D). In one embodiment, security database (904D) may store a listing of police stations, hospitals, and other locations for routing purposes. Additionally, security database (904D) may store temporary data regarding facial identifiers or biometric attributes. Security database (904D) may additionally store one or more machine learning models used to classify images. Each of these storage aspects are described more fully in the accompanying flow diagrams and the details of these diagrams are incorporated herein by reference in their entirety.

Each of the devices is connected via a bus (908). In one embodiment, the bus (908) may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 10:
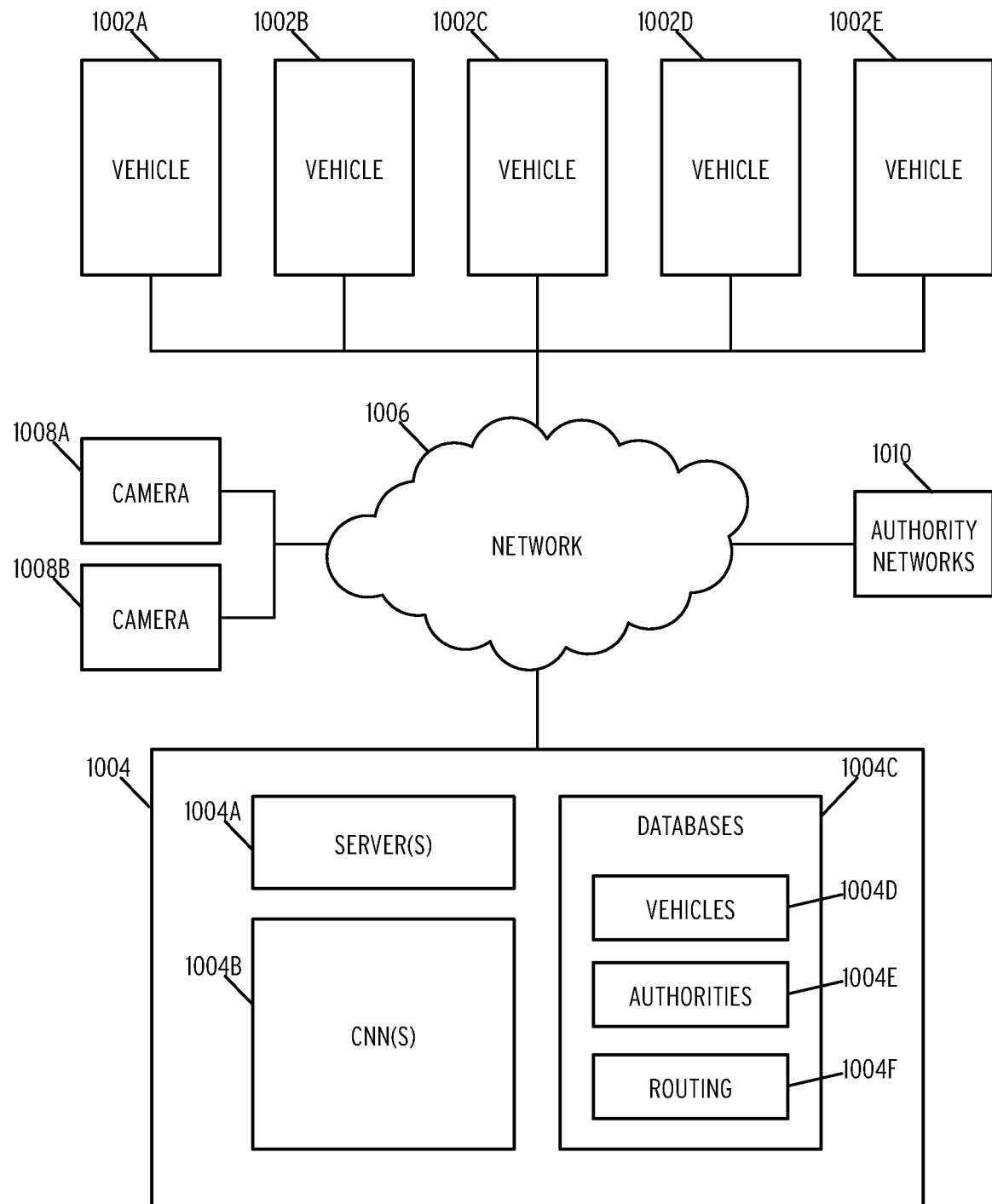
FIG. 10 is a block diagram of a centralized autonomous vehicle operations system according to some embodiments of the disclosure.

FIG. 10 is a block diagram of a centralized autonomous vehicle operations system according to some embodiments of the disclosure.

As illustrated, the system includes a number of autonomous vehicles (1002A-1002E). In one embodiment, each autonomous vehicle may comprise an autonomous vehicle such as that depicted in FIG. 9, the disclosure of which is incorporated herein by reference in its entirety.

Each autonomous vehicle (1002A-1002E) may communication with a central system (1004) via a network (1006). In one embodiment, network (1006) comprises a global network such as the Internet.

A plurality of cameras (1008A-1008B) and authority networks (1010) are additionally coupled to the central system (1004) via network (1006). In one embodiment, the cameras (1008A-1008B) comprise stationary, and optionally third party, cameras installed at known geographic locations as discussed previously. Additionally, authority networks (1010) may comprise emergency or other networks that provide access (via APIs or via telephone calls) to emergency services. If the authority networks (1010) provide telephonic access, the central system (1004) may be configured to initiate VoIP calls to the authority networks (1010).

Central system (1004) includes a plurality of servers (1004A). In one embodiment, the number of servers (1004A) may be dynamically scaled based on network loads. In general, servers (1004A) include front-end web servers to handle network requests (e.g., API calls). Servers (1004A) additionally may include application servers to perform the operations described primarily in connection with FIGS. 6-8, the disclosure of which is incorporated herein by reference.

Central system (1004) additionally includes one or more machine learning models such as CNNs (1004B). In one embodiment, central system (1004) may continuously train and re-train CNNs (1004B) based on data received from autonomous vehicles (1002A-1002E). Details of this training process are described more fully above and this detail is incorporated herein by reference in its entirety. In some embodiments, the central system (1004) may periodically transmit the model and/or model parameters of the CNNs (1004B) to the autonomous vehicles (1002A-1002E).

Central system (1004) additionally includes a plurality of databases (1004C). The databases (1004C) may store details to support the operation of the system (1004) such as a database of autonomous vehicles (1004D), a database of known authorities and contact methods (1004E), and routing information (1004F). In some embodiments, databases (1004C) may be implemented using a cluster of relational and/or non-relational databases.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
receiving a distress signal including a geographic location associated with a user in distress;
identifying a plurality of autonomous vehicles based on their proximity to the geographic location, wherein the identifying includes querying a centralized system for a listing of autonomous vehicles currently near the geographic location;
selecting at least one responsive autonomous vehicle from the plurality of autonomous vehicles based on comparing computed travel routes and determining that a travel route of the at least one responsive autonomous vehicle has a shortest travel time to the geographic location among the travel routes computed for the plurality of autonomous vehicles, wherein the travel route comprises a driving route of the responsive autonomous vehicle on at least one roadway;
routing the at least one responsive autonomous vehicle to the geographic location; and
executing at least one security maneuver in response to detecting the user at the geographic location, the at least one security maneuver controlling at least one subsystem of the at least one responsive autonomous vehicle while near the user.

2. The method of claim 1, wherein the geographic location comprises either a global positioning system (GPS) location of a mobile device or an identification of a cellular tower servicing the mobile device.

3. The method of claim 1, wherein receiving a distress signal comprises receiving a notification from an application running on a mobile device.

4. The method of claim 1, wherein identifying the plurality of autonomous vehicles comprises querying a centralized system for a listing of autonomous vehicles currently near the geographic location.

5. The method of claim 1, wherein identifying the plurality of autonomous vehicles comprises pinging a fleet of autonomous vehicles to determine the plurality of autonomous vehicles.

6. The method of claim 1, further comprising detecting that no autonomous vehicles are near the geographic location and transmitting an emergency signal.

7. The method of claim 1, further comprising detecting that no travel time in a plurality of travel times of the plurality of autonomous vehicles is below a pre-configured threshold and transmitting an emergency signal.

8. The method of claim 1, wherein selecting the at least one responsive autonomous vehicle comprises selecting an autonomous vehicle closest to the geographic location based on a respective travel time.

9. The method of claim 1, wherein selecting the at least one responsive autonomous vehicle comprises selecting multiple autonomous vehicles.

10. The method of claim 1, wherein routing the at least one responsive autonomous vehicle to the geographic location comprises transmitting the geographic location to the at least one autonomous vehicle.

11. A non-transitory computer-readable storage medium for tangibly storing computer program instructions capable of being executed by a computer processor, the computer program instructions defining the steps of:
receiving a distress signal including a geographic location associated with a user in distress;
identifying a plurality of autonomous vehicles based on their proximity to the geographic location, wherein the identifying includes querying a centralized system for a listing of autonomous vehicles currently near the geographic location;

selecting at least one responsive autonomous vehicle from the plurality of autonomous vehicles based on comparing computed travel routes and determining that a travel route of the at least one responsive autonomous vehicle has a shortest travel time to the geographic location among the travel routes computed for the plurality of autonomous vehicles, wherein the travel route comprises a driving route of the responsive autonomous vehicle on at least one roadway;

routing the at least one responsive autonomous vehicle to the geographic location; and executing at least one security maneuver in response to detecting the user at the geographic location, the at least one security maneuver controlling at least one subsystem of the at least one responsive autonomous vehicle while near the user.

12. The non-transitory computer-readable storage medium of claim 11, wherein the geographic location comprises either a global positioning system (GPS) location of a mobile device or an identification of a cellular tower servicing the mobile device.

13. The non-transitory computer-readable storage medium of claim 11, wherein receiving a distress signal comprises receiving a notification from an application running on a mobile device.

14. The non-transitory computer-readable storage medium of claim 11, wherein identifying the plurality of autonomous vehicles comprises querying a centralized system for a listing of autonomous vehicles currently near the geographic location.

15. The non-transitory computer-readable storage medium of claim 11, wherein identifying the plurality of autonomous vehicles comprises pinging a fleet of autonomous vehicles to determine the plurality of autonomous vehicles.

16. The non-transitory computer-readable storage medium of claim 11, the instructions further defining the step of detecting that no autonomous vehicles are near the geographic location and transmitting an emergency signal.

17. The non-transitory computer-readable storage medium of claim 11, further comprising detecting that no travel time in a plurality of travel times of the plurality of autonomous vehicles is below a pre-configured threshold and transmitting an emergency signal.

18. The non-transitory computer-readable storage medium of claim 11, wherein selecting the at least one responsive autonomous vehicle comprises selecting an autonomous vehicle closest to the geographic location based on a respective travel time.

19. The non-transitory computer-readable storage medium of claim 11, wherein routing the at least one responsive autonomous vehicle to the geographic location comprises transmitting the geographic location to the at least one autonomous vehicle.

20. A device comprising:
a processor; and
a storage medium for tangibly storing thereon program logic for execution by the processor, the stored program logic comprising:

logic, executed by the processor, for receiving a distress signal including a geographic location associated with a user in distress;

logic, executed by the processor, for identifying a plurality of autonomous vehicles based on their proximity to the geographic location, wherein the identifying includes querying a centralized system for a listing of autonomous vehicles currently near the geographic location;

logic, executed by the processor, for selecting at least one responsive autonomous vehicle from the plurality of autonomous vehicles based on comparing computed travel routes and determining that a travel route of the at least one responsive autonomous vehicle has a shortest travel time to the geographic location among the travel routes computed for the plurality of autonomous vehicles, wherein the travel route comprises a driving route of the responsive autonomous vehicle on at least one roadway;

logic, executed by the processor, for routing the at least one responsive autonomous vehicle to the geographic location; and logic, executed by the processor, for executing at least one security maneuver in response to detecting the user at the geographic location, the at least one security maneuver controlling at least one subsystem of the at least one responsive autonomous vehicle while near the user.

* * * * *